(12) United States Patent
Malek

(10) Patent No.: US 6,474,909 B1
(45) Date of Patent: Nov. 5, 2002

(54) FLUID ASSISTED GROUND WEDGING DEVICE

(76) Inventor: Robert Malek, 1229 Ballantrae, Mundelein, IL (US) 60060

( * ) Notice: Subject to any disclaimer, the term of this patent is extended or adjusted under 35 U.S.C. 154(b) by 0 days.

(21) Appl. No.: 09/693,154

(22) Filed: Oct. 20, 2000

(51) Int. Cl.[7] .............................. E02F 5/10; A01B 13/08
(52) U.S. Cl. ................. 405/180; 405/182; 405/154.1; 37/366; 37/380; 172/699; 172/724; 111/123
(58) Field of Search ................ 405/154.1, 158–165, 405/174, 178, 180, 182; 37/344, 347, 366, 370, 367, 380; 172/699, 720, 721, 722, 724, 730, 733; 111/123, 118

(56) References Cited

U.S. PATENT DOCUMENTS

| | | | | | |
|---|---|---|---|---|---|
| 3,268,012 A | * | 8/1966 | Ratkowski | .................. | 172/700 |
| 3,338,060 A | * | 8/1967 | Harmstorf | .................. | 405/163 |
| 3,434,297 A | * | 3/1969 | Gretter et al. | ............... | 405/160 |
| 3,777,500 A | * | 12/1973 | Kelley | .......................... | 405/180 |
| 4,362,436 A | * | 12/1982 | Harmstorf | .................. | 405/161 |
| 4,498,813 A | | 2/1985 | Nelson et al. | ............... | 405/182 |
| 4,812,079 A | * | 3/1989 | Johnson et al. | ............. | 405/164 |
| 4,867,607 A | * | 9/1989 | Johnson et al. | ............. | 405/182 |
| 5,119,888 A | * | 6/1992 | Hall | ........................... | 172/699 |
| 5,148,880 A | * | 9/1992 | Lee et al. | .................... | 175/393 |
| 5,433,277 A | * | 7/1995 | Davison | ................. | 405/182 X |
| H1642 H | * | 4/1997 | Jenkins | ........................ | 405/159 |
| 6,012,536 A | * | 1/2000 | Puttmann et al. | .............. | 176/21 |
| 6,036,403 A | | 3/2000 | Hitzke | .......................... | 405/164 |
| 6,095,721 A | * | 8/2000 | Von Benzon | ............... | 405/180 |
| 6,116,818 A | * | 9/2000 | Bitetto et al. | ................ | 405/159 |

FOREIGN PATENT DOCUMENTS

| | | | | |
|---|---|---|---|---|
| EP | 278705 | * | 8/1988 | .................. 405/164 |
| GB | 2163198 | * | 2/1986 | .................. 405/180 |

* cited by examiner

*Primary Examiner*—Heather Shackelford
*Assistant Examiner*—Jong-Suk Lee
(74) *Attorney, Agent, or Firm*—Lee, Mann, Smith, McWilliams, Sweeney and Ohlson

(57) ABSTRACT

A fluid assisted wedging and compacting device for the installation of underground cable that includes a blade with a cutting edge, two cutting faces a toe, a shoe, a cable feed tube, a pair of deflectors, a pair of grooves and a plurality of high pressure water jet nozzles. The blade is designed so that the deflectors and grooves are positioned in a vertical orientation on the lower half of the cutting faces of the blade. During use, the deflectors on the cutting faces deflect soil creating a soil free zone preventing blockage of the nozzles and allowing the water pressure from the nozzles to effectively aid the blade in cutting through the soil.

22 Claims, 2 Drawing Sheets

FLUID ASSISTED GROUND WEDGING DEVICE

BACKGROUND OF THE INVENTION

This invention may be described as a fluid assisted wedging and compacting device which is used to lay cable underground by wedging and compacting an opening and simultaneously laying cable in the soil and is designed to provide high pressure water through the wedging face of a blade to improve overall wedging efficiency.

DESCRIPTION OF THE RELATED ART

The present invention relates to a device for installing cable underground and more particularly to a specifically designed wedging and compacting blade arrangement for use in such device.

Present devices used for installing cable consist primarily of a vertical blade attached to a boom of a power driven land vehicle. The land vehicle is equipped with one or more cable spools to supply cable to a cable feed tube, typically installed behind the blade. The blade can be of various lengths and has a wedging surface on the front half to wedge an opening in the soil. The blade is typically connected to a hydraulically operated boom that lowers the blade into soil to a preselected depth wherein the vehicle drags the blade a specified distance. To prevent the shoe from being dragged upward out of the ground, a toe is typically connected to the bottom of the blade which causes the blade to dig deeper, counteracting the blades tendency to pull out of the ground. To prevent the blade from diving too deep into the soil, a shoe can be placed at the top of the blade. The shoe rides along the surface of the soil maintaining a constant blade elevation. To increase the wedging effectiveness of the blade, a vibratory device can be installed on the blade mount to vibrate the blade while it wedges through the soil. As the blade wedges a trench in the soil, the cable feed tube, which is typically pivotally attached to the rear of the blade, guides one or more cables into the freshly wedge trench. When wedging dry dense clay soil, it becomes difficult or impossible to drag the blade and rate of speed high enough to be considered commercially useful. In order to wedge through clay, it is necessary to wedge incrementally, making several passes with the blade until the desired depth is achieved. To further increase the wedging effectiveness of the blade when the soil is hard and dense, it has been found that the addition of high pressure water jets attached to the blade aid in wedging through the soil. An example of a wedging and compacting apparatus that uses high pressure water can be found in U.S. Pat. No. 4,498,813, entitled UNDERGROUND CABLE INSTALLING APPARATUS AND METHOD UTILIZING A FLUID JET ASSISTED, VIBRATING BLADE ARRANGEMENT. This reference utilizes high pressure water jet nozzles located on the wedging edge of the blade to aid in wedging through the soil. It has been found that nozzles positioned along the wedging edge of the blade, as in the '813 reference, provide little gain in wedging speed. Actual testing of a blade with water jet nozzles placed along the wedging edge of the blade did very little to increase the wedging rate due to the blocking of the nozzles. The forward movement of the wedging and compacting blade forces the wedging edge of the blade into the clay, blocking the lower nozzles, eliminating the aid of the water on the lower section of the blade, where it is needed most. This reference as well as other prior art devices do not provide for a wedging and compacting device that can be dragged through hard dense clays and a commercially useful rate of speed.

SUMMARY OF THE INVENTION

This invention may be described as a fluid assisted wedging and compacting device that enhances the wedging characteristics of the blade, allowing the device to wedge an opening in the soil at a greater rate of speed, reducing the amount of power required to move the blade. The wedging and compacting device is comprised of a blade with high pressure water jet nozzles, a blade toe, a ground shoe and a cable feed tube. The wedging and compacting device is of a vertical arrangement and has a forward facing blade and a connector to allow for pivotal attachment of the cable feed tube. The forward facing blade includes a sharpened blade cutting edge and a blade cutting face located on either side of the edge. The high pressure jet nozzles are placed within a vertically extending groove located on the face of the blade. Directly in front of the groove is an elongated deflector that protects the groove and nozzles from becoming compacted with soil when the blade is dragged forward. It has been found through experimentation that the placement of the high pressure water jets within a groove near the rear of the face of the blade in combination with the protection provided by the deflector, greatly enhances the wedging effectiveness of the high pressure jet nozzles, typically doubling the wedging rate. It has been found that when the blade of the present design is dragged through the soil, a void is created behind the deflector preventing dirt from blocking off the nozzles. Nozzles placed along the wedging edge of the blade, as shown in the prior art, have been found to be ineffective because the pressure of the forward movement of the blade against the dense soil prevents the expulsion of water out of the nozzles. The placement of the jet nozzles in a perpendicular orientation along the face of the blade erodes and softens the soil on the sides of the blade, increasing the overall width of the trench and providing a lubrication to reduce the frictional forces on the wedging and compacting device and feed tube as they are dragged through the soil.

DETAILED DESCRIPTION OF THE INVENTION

Figure 1:
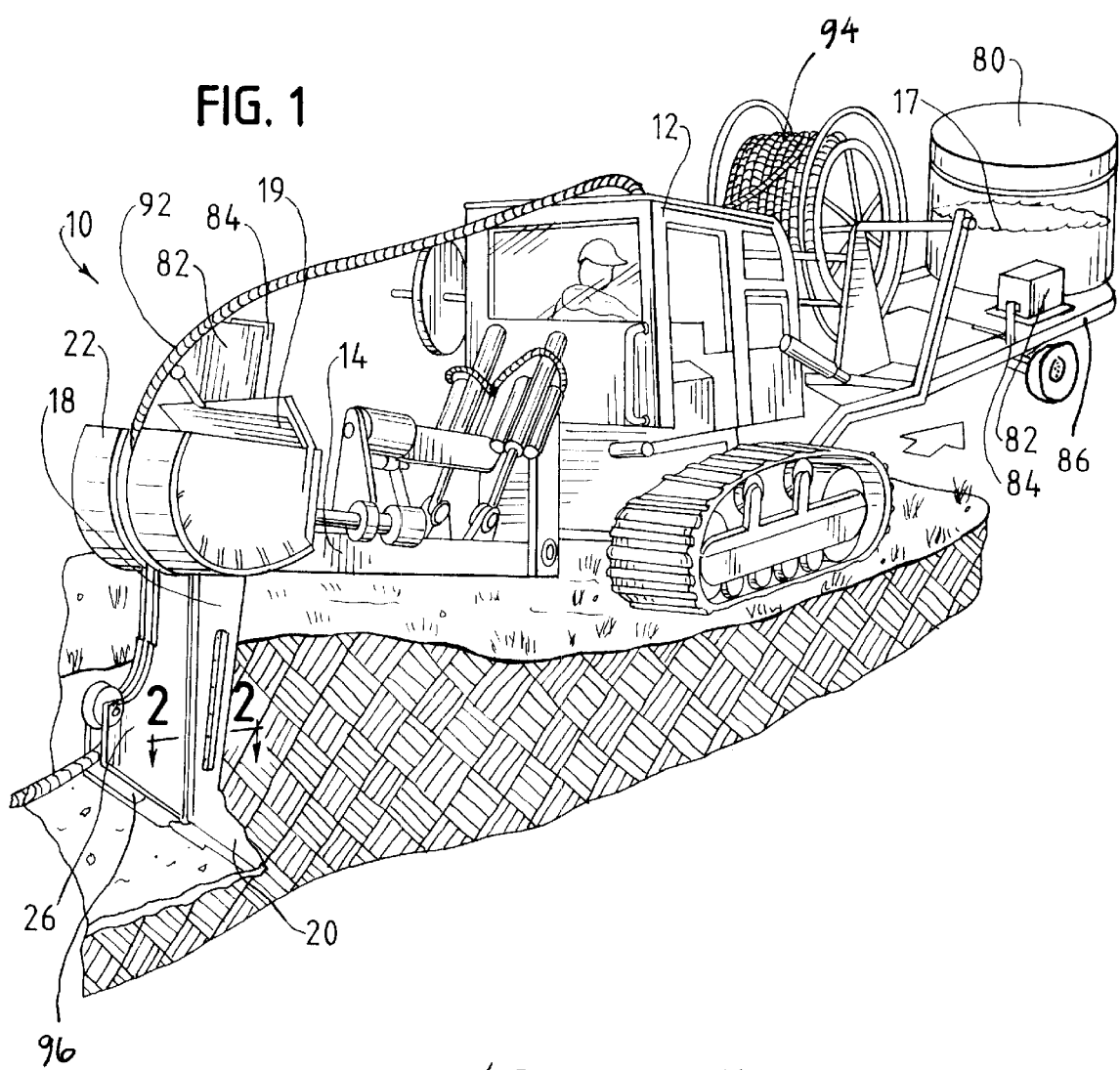
FIG. 1 is a perspective view of the fluid assisted wedging and compacting device connected to a power driven land vehicle with the blade inserted in the soil.

For the purpose of promoting an understanding of the principles of the invention, references will be made to the embodiment illustrated in the drawings. Specific language will also be used to describe the same. It will, nevertheless, be understood that no limitation of the scope of the invention is thereby intended, such alterations and further modifications in the illustrated device, and such further applications of the principles of the invention illustrated herein being contemplated as would normally occur to one skilled in the art to which the invention relates.

A preferred embodiment of a wedging and compacting device blade 18 of the present invention is shown in FIG. 1 attached to a power driven land vehicle 12 and has a cable feed tube 26 attached to the rear of the blade 18. The blade 18 is vertically oriented and is adapted to be attached to a boom 14 of a power driven land vehicle 12, such as a tractor, bulldozer or other earth moving vehicle, which has the power to drag the wedging and compacting device 10 through soil. The wedging and compacting device 10 incorporates jet nozzles 16, shown in FIG. 2, and a high pressure water system 17, shown in FIG. 1, to assist the blade 18 by loosening the soil.

Figure 3:
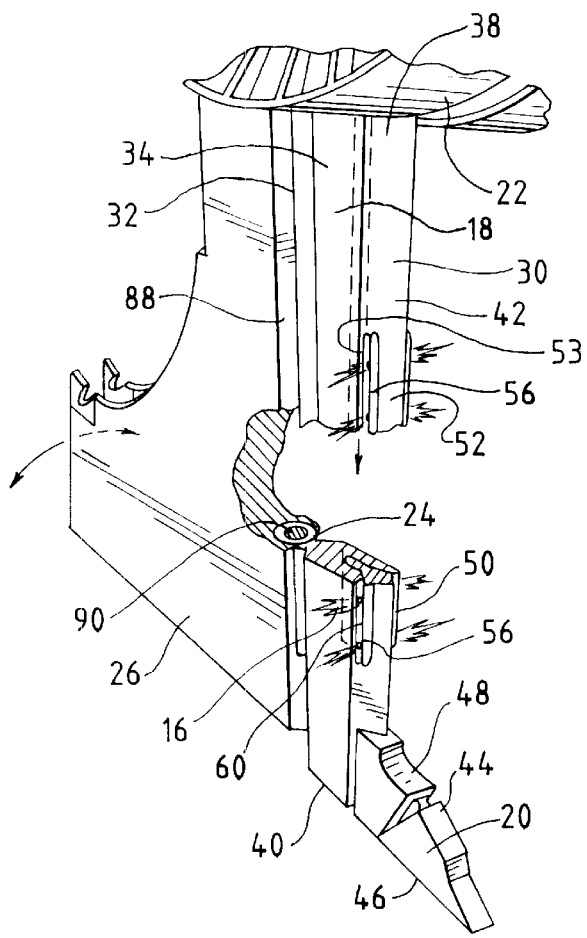
FIG. 3 is a perspective view of the fluid assisted wedging and compacting device of the present invention having a section of the blade wedge away to expose the manifold.

The wedging and compacting device 10 includes a vertical blade 18, a toe 20, a shoe 22, a cable feed tube mount 24, shown in FIG. 3, the land vehicle 12, the boom 14, a vibrator 19, ports 29, the cable feed tube 26, a water manifold 28, the high pressure water system 17 and jet nozzles 16. The blade 18, as shown in FIG. 3, is vertically oriented and is preferably fabricated out of a solid piece of high strength steel but other metals can be used. The vertical blade 18 includes a front surface 30, a rear surface 32, a first side surface 34, a second side surface 36 a top end 38 and a bottom end 40. The front surface 30 includes a toe 20 and a blade 42. The toe 20 is attached to the front surface 30 at a location near the bottom end 40 of the vertical blade 18. The toe 20 is a solid structure and is preferably manufactured of steel. The toe 20 is wedge shaped and extends outwardly and downwardly from the front surface 30 of the blade 18. The toe 20 includes a top surface 44 and a bottom surface 46 where in the bottom surface 46 is coplanar with the bottom end 40 of the vertical blade 18. The top surface 44 includes a tapered step 48 to reduce the drag on the toe 20 when wedging through the soil. The toe 20 is typically welded to the bottom end 40 of the vertical plow blade 18 but can be attached by fasteners such as rivets or bolts. When wedging an opening in the soil, the blade 18 has a tendency to move upward out of the ground and the bottom end 40 of the blade 18 has a tendency to tilt rearward, decreasing the depth of the trench opened by the blade 18. The tendency of the blade 18 to lift out of the soil is caused by the variation of soil density and its effect on the blade 18. The soil deeper in the ground is denser than the soil nearer to the surface. As the blade 18 is dragged through the soil, a greater force is exerted on the lower portion of the blade 18. The unequal forces acting upon the length of the blade cause the bottom end 40 of the blade 18 to pivot rearward and upward. The addition of the toe 20 creates a downward drag on the blade 18, counteracting the tendency of the blade 18 to pull out of the soil.

Figure 2:
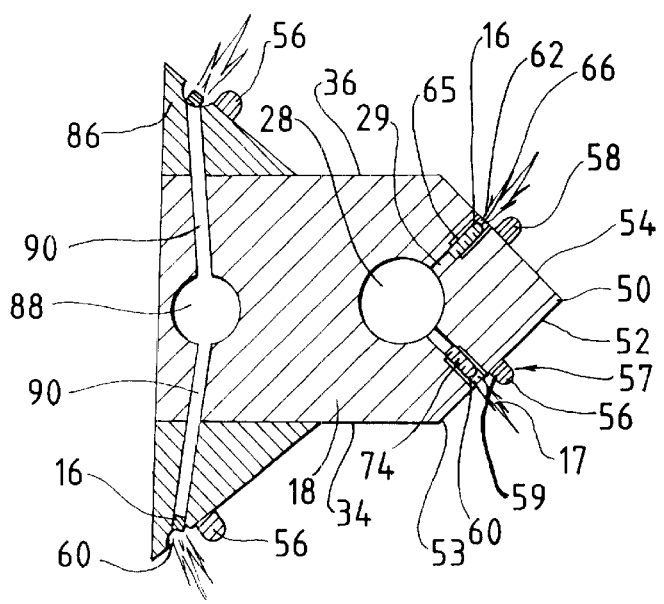
FIG. 2 is a cross-sectional view of the fluid assisted wedging and compacting device according to FIG. 1 showing the orientation of the jets and the location of the manifold.

The blade 18, as shown in FIG. 2, includes a forward facing wedging or cutting edge 50 and a first 52 and a second 54 wedging 0r cutting faces that taper outwardly from the wedging edge 50 to the first 34 and second 36 side surfaces. Alternatively, the blade 18 may include a wedging edge 50 and only one wedging face 52, wherein the wedging edge 50 is formed by the intersection of the wedging face 52 with either the first side surface 34 or the second side surface 36. The length of the blade 18 may vary in height, with a preferred range from 18 to 80 inches. The wedging edge 50 and wedging faces 52 and 54 extend vertically downward from the top end 38 of the blade 18 to the top surface 46 of the toe 20. The wedging edge 50 is positioned along the vertical centerline of the blade 18 and is adapted to initiate the partition of the soil. Each of the wedging faces 52 and 54 are preferably angled 45 degrees from the centerline of the wedging edge 50 but the angle of the wedging faces 52 and 54 may be increased or decreased depending upon intended use. The wedging faces 52 and 54 act as a wedge to divide the soil, creating a trench of a desired width. The force of the forward moving blade 18 exerts a pressure between the blade faces 52 and 54 and the soil causing soil compaction to enable the formation of the trench.

The blade 18 also includes a pair of deflector ribs 56 and 58 that extend outwardly from the wedging faces 52 and 54. The deflectors 56 and 58 are oriented in a vertical fashion and are located at the rear edge 53 of the wedging faces 52 and 54 near the side surfaces 34 and 36. The deflectors 56 and 58 include a front surface 57 and a rear surface 59 and are made out of steel. The deflectors 56 and 58 can be fabricated out of steel rods or bars that are either bolted or welded onto the faces 52 and 54 of the blade 18 or a continuous weld bead. The blade faces 52 and 54 further include a pair of grooves 60 and 62 that are vertically oriented on the wedging faces 52 and 54 and are adjacent to the rear surface 59 of the deflectors 56 and 58 near the side surfaces 34 and 36. The deflectors 56 and 58 and the grooves 60 and 62 are positioned on the lower half of the blade 18, preferably on the lower 40 percent. The grooves 60 and 62 have a bottom surface 64 that includes threaded apertures 65, which are adapted to accept the water jet nozzles 16 and are oriented so that the high pressure water stream, when exiting the nozzles 16, is perpendicular to the wedging faces 52 and 54. Alternatively, the nozzles 16 can be positioned on the wedging faces 52 and 54 without the grooves 60 and 62. As shown in FIG. 3, each wedging face 52 includes one vertically oriented deflector 56, one groove 60 and several high pressure nozzles 16. Alternatively, the nozzles 16 in the grooves 60 and 62 can be varied from their perpendicular orientation in such a way so that the stream of water is directed either slightly downward, upward, forward or rearward, depending on soil conditions. The deflectors 56 and 58 enhance the function of the jet nozzles 16 by creating a void in the soil. When the wedging and compacting device 10 is dragged forward through the soil, the front surface 57 of the deflectors 56 and 58 deflects the soil away from the face of the blade so a soil free zone is created directly behind the rear surface 59. The lack of soil directly behind the deflectors 56 and 58 protects the jet nozzles 16, recessed in the grooves 60 and 62 from clogging, allowing the high pressure water to flow freely through all of the nozzles 16. It has been found that nozzles 16 placed along the wedging edge 50 become blocked when the blade 18 is dragged through dense soils, such as clay, because the pressure of the wedging edge 50 against clay is great enough to limit or prevent water from flowing out of the jet nozzles 16. Since the lower nozzles 16 are blocked, the remaining nozzles 16 located higher on the blade 18 release higher volumes of water at greater pressures, short circuiting the system. By recessing the nozzles 16 in grooves 60 and 62 behind the deflectors 56 and 58, dense clays are deflected away from the nozzles 16, allowing the high pressure water to escape, thereby aiding the blade 18 in wedging through the soil. The nozzles 16 are cylindrical in shape and include an orifice 66 that passes through the center to allow for the passage of water. The orifice 66 can be of different diameters to vary the flow rate of the water. The nozzles 16 also include an exterior surface 72 that contains threads 74 that allow the nozzles 16 to be removed from the threaded apertures 65 and replaced with different sizes. The second end 70 of the nozzles 16 are designed so that when the nozzles 16 are screwed into the threaded apertures 65 a seal is formed preventing water from leaking through the threads 74. It has been found that six nozzles 16 placed on the first wedging face 52 and six nozzles 16 placed on the second wedging face 54 with the nozzles 16 spaced 6 inches apart and placed on the lower half of a six foot blade 18 provide for an effective wedging and compacting arrangement. While this represents a typical arrangement, other arrangements can be used.

High pressure water is supplied to the nozzles 16 by use of a manifold 28, and water ports 29. The manifold 28 extends vertically through the entire length of the blade body 18. The manifold 28 is manufactured by drilling from the bottom end 40 of the blade 18 through to the top end 38. The bottom end 40 of the manifold 28 is plugged to prevent the exit of water. The size of the manifold bore 28 is preferred to be ⅝inches in diameter, which is adequate to flow water at a rate of 65 gallons/minute at 2000 pounds per square inch. The manifold 28 connects to the threaded apertures 65 through ports 29 that provide a passageway for the water to flow from the manifold 28 to the nozzle 16. Each jet nozzle 16 has its own port 29 and threaded aperture 65, each port 29 having a 3/16" diameter. The size of the manifold 28 and port 29 diameters can be increased or decreased depending on the volume and pressure of the water. To provide the water to the manifold 28, a high pressure water system 17 is used, as shown in FIG. 1. The high pressure water system 17 is comprised of a water tank 80, a high pressure pump 82 and a high pressure line 84. The high pressure line 84 is attached to a fitting 82 at the top end 38 of the blade 18 to supply water coming from the pump 82. The water used for the nozzle system is stored in the water tank 80, typically installed on the land vehicle 12 or on a trailer 86. To supply the water pressure, an intensifier pump is used, which develops the desired water pressures. The intensifier pump is preferred because it generates a pulsating pressure rather than a constant pressure which enhances the wedging and compacting effectiveness of the jet nozzles 16. A constant pressure pump may be substituted for the intensifier pump if desired.

The first and second side surfaces 34 and 36 of the blade 18 are generally planer and are parallel to the centerline of the blade 18. The side surfaces 34 and 36 contain a plurality of apertures (not shown) that extend through the blade 18 near the top end 38 to allow attachment to the boom 14. The side surfaces 34 and 36 further include an outwardly extending wedge 86, as shown in FIG. 2. The wedge 86 extends vertically along the length of the blade 18, near the rear surface 32. The purpose of the wedges 86 is to enlarge the trench in the soil so the cable feed tube 26 can follow the blade 18 with little resistance. The cable feed tube 26, shown in FIG. 3, which attaches to the rear surface 32 of the blade 18, is typically wider than the blade to accommodate the cables. The front surface 88 of the cable feed tube 26 is typically flat and would be difficult to drag behind the blade 18 without the increase trench width created by the wedges 86. The wedges 86 are sized so that the overall width of the blade 18 with the wedge 86 is approximately the width of the cable feed tube 26. The rear surface 32 of the blade 18 is relatively planar and includes mounts 90 to allow pivotal attachment of the cable feed tube 26.

Figure 4:
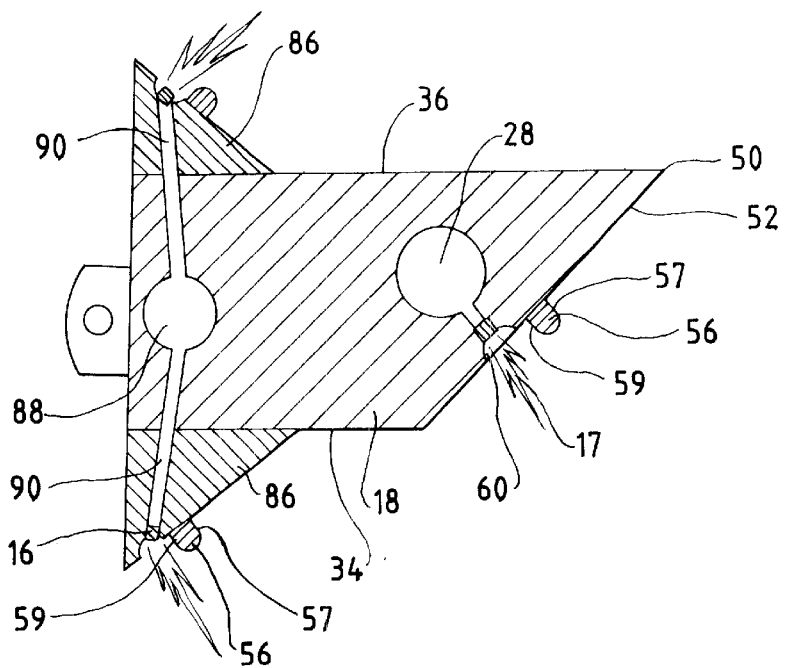
FIG. 4 is a cross-sectional view of an alternate embodiment of the fluid assisted wedging and compacting device of the present invention with only one blade face.

It may be desirable to include a second manifold 88 and extra ports 90 to provide water to jets 16 located on the wedges 86, as shown in FIGS. 2 and 4 to increase wedging effectiveness of the blade 18.

While it is preferred for the cable feed tube 26 to pivot behind the blade 18, it can also be rigidly affixed. The cable feed tube 26 is designed to guide one or more cables 92 that are wound around spools 94 located on the vehicle 12 into the trench behind the blade 18, as shown in FIG. 1. The cable feed tube 26 typically includes a plurality of tubes 96 that are arranged so that the incoming cables 92 are repositioned from a vertical orientation to a horizontal orientation. To increase the wedging effectiveness of the blade 18, a vibrator 19 can attached to the boom 14, which vibrates the blade 18 as it is dragged through the soil. The vibrating motion of the blade 18 increases the rate of speed with which the trench can be created.

To create a trench with the wedging and compacting device 10, the vertical blade 18 is pivoted so that the bottom end 40 of the blade 18 is positioned rearward of the vertical centerline. The boom 14 of the vehicle 12 pushes the blade 18 into the soil to the desired depth and pivots the blade 18 back to the upright vertical position. The water supply to the jet nozzles 16 is typically energized after the blade 18 is positioned into the soil but can be energized before as well. Once the blade 18 is inserted into the soil, cables 92 are placed in the cable feed tube 26 and the land vehicle 12 is moved in a forward direction, forcing the front surface 30 of the blade 18 to wedge and compact an opening in the soil. Depending on soil conditions, the vibrator 19 may be energized to increase the wedging rate of the blade 18. As the blade 18 moves forward through the soil, the cable 92 is fed from the spool 94 to the cable feed tube 26, laying a continuous line of cable in the trench. During the wedging and compacting process, the water pressure supplied to the jets can be lowered, reducing water consumption, since it is not always necessary to apply maximum pressure to the water jets 16 when wedging. Typically when wedging through dry, dense clay, a non-vibratory blade 18 can typically wedge open a trench at a rate of 20–28 feet/minute. By pumping high pressure water through the jet nozzles 16, the rate of wedging increases to a rate of 42–52 feet/minute. Similarly, a vibrating blade 18 that is wedging at a rate of 45–48 feet/minute is increased to 75 feet/minute by pumping water through the nozzles 16.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A ground wedging device, comprising:

a generally vertical main body portion having a blade along the forward edge;

said blade including a cutting face;

a cutting edge adjacent to said cutting face;

a substantially vertical deflector rib extending from and along said cutting face;

a plurality of nozzles positioned on said cutting face behind said deflector rib, adapted to expel a liquid outwardly from said cutting face;

whereby said liquid expelled from said plurality of nozzles enhances the ability of said ground wedging device to cut through the ground.

2. A soil wedging device, comprising:

a blade;

a first cutting face and a second cutting face formed on a front surface of said blade;

a cutting edge formed by the intersection of said first cutting face and said second cutting face;

a first substantially vertical deflector rib extending from and along said first cutting face;

a second deflector extending from and along said second cutting face; and a plurality of nozzles positioned on said first cutting face and said second cutting face behind said deflector ribs, adapted to expel a liquid outwardly from said first cutting face and said second cutting face.

3. The soil wedging device of claim 2, wherein said first deflector rib and said second deflector rib include a front side and a rear side, said front side adapted to deflect soil, creating a soil free zone behind said first deflector rib and said second deflector rib.

4. The soil wedging device of claim 2, wherein said plurality of nozzles are recessed into said cutting faces.

5. The soil wedging device of claim 4, wherein said recession forms a plurality of substantially vertical grooves, said plurality of grooves extending along said cutting faces.

6. The soil wedging device of claim 5, wherein said plurality of grooves is positioned behind both of said deflector ribs.

7. The soil wedging device of claim 5, wherein said first deflector, said second deflector, said at least one groove and said plurality of nozzles are vertically oriented on the lower half of said blade.

8. The soil wedging device of claim 2, wherein said plurality of nozzles positioned on said first cutting face expel the liquid perpendicular to said first cutting face and said plurality of nozzles positioned on said second cutting face expel the liquid perpendicular to said second cutting face.

9. The soil wedging device of claim 2 wherein said liquid is under pressure.

10. The soil wedging device of claim 2, further including outwardly extending wedges.

11. The soil wedging device of claim 10, wherein said wedges include a nozzle for expelling a liquid under pressure.

12. A ground wedging device, comprising:
a blade;
a cutting face formed on a front surface of said blade;
a cutting edge formed by the intersection of said cutting face on a side surface;
a substantially vertical deflector rib extending from and along said cutting face;
at least one nozzle positioned on said cutting face behind said deflector rib, adapted to expel a liquid outwardly from said cutting face;
whereby said liquid expelled from said at least one nozzle enhances the ability of said ground trenching apparatus to cut through the ground.

13. The ground wedging device of claim 12, wherein said deflector rib includes a front side and a rear side, said front side adapted to deflect soil, creating a soil free zone behind said deflector rib.

14. The ground wedging device of claim 12, wherein said at least one nozzles is recessed.

15. The ground wedging device of claim 14, wherein said recession forms at least one substantially vertical groove.

16. The ground wedging device of claim 15, wherein said at least one groove is positioned behind said deflector rib.

17. The ground wedging device of claim 12, wherein said blade includes at least one wedge, said at least one wedge includes a wedging face.

18. The ground wedging device of claim 17, wherein said wedging face includes at least one nozzle.

19. The ground wedging device of claim 18, wherein said at least one nozzle is recessed in a groove.

20. The ground wedging device of claim 17, wherein said wedging face includes an outwardly extending deflector.

21. A soil wedging device, comprising:
a blade;
a first cutting face and a second cutting face formed on a front surface of said blade;
a cutting edge formed by the intersection of said first cutting face and said second cutting face;
a first deflector extending from said first cutting face;
a second deflector extending from said second cutting face; and
a plurality of nozzles positioned on said cutting faces, adapted to expel a liquid outwardly from said cutting faces;
said blade further including outwardly extending wedges, wherein said wedges include a nozzle for expelling a liquid under pressure.

22. A ground wedging device, comprising:
a blade
a cutting face formed on a front surface of said blade;
a cutting edge formed by the intersection of said cutting face on a side surface;
a deflector extending from said cutting face;
at least one nozzle positioned on said cutting face, adapted to expel a liquid outwardly from said cutting face;
a wedge extending outwardly from said side surface of said blade, said wedge including a wedging face, wherein said wedging face includes at least one nozzle.

* * * * *